US012626239B2

(12) United States Patent
Bradstreet

(10) Patent No.: US 12,626,239 B2
(45) Date of Patent: *May 12, 2026

(54) PROVIDING REAL-TIME REPLACEMENT CREDIT ACCOUNT INFORMATION TO A CUSTOMER WHEN AN EXISTING PHYSICAL CARD ASSOCIATED WITH THE CREDIT ACCOUNT IS COMPROMISED

(71) Applicant: BREAD FINANCIAL PAYMENTS, INC., Columbus, OH (US)

(72) Inventor: Ann Bradstreet, Columbus, OH (US)

(73) Assignee: BREAD FINANCIAL PAYMENTS, INC., Columbus, OH (US)

( * ) Notice: Subject to any disclaimer, the term of this patent is extended or adjusted under 35 U.S.C. 154(b) by 72 days.

This patent is subject to a terminal disclaimer.

(21) Appl. No.: 16/872,240

(22) Filed: May 11, 2020

(65) Prior Publication Data

US 2021/0012312 A1     Jan. 14, 2021

Related U.S. Application Data

(60) Provisional application No. 62/872,143, filed on Jul. 9, 2019.

(51) Int. Cl.
*G06Q 20/24* (2012.01)

(52) U.S. Cl.
CPC ................................... *G06Q 20/24* (2013.01)

(58) Field of Classification Search
CPC ..... G06A 40/00; G06Q 20/24; G06Q 20/4016
See application file for complete search history.

(56) References Cited

U.S. PATENT DOCUMENTS

| | | | | |
|---|---|---|---|---|
| 5,832,068 A | * | 11/1998 | Smith ................. | H04M 3/5158 379/114.04 |
| 6,163,771 A | * | 12/2000 | Walker ................... | G06Q 20/04 705/18 |
| 7,076,462 B1 | * | 7/2006 | Nelson ................... | G06Q 40/02 705/38 |
| 7,409,369 B1 | * | 8/2008 | Homuth ................. | G06Q 40/02 705/39 |
| 7,818,228 B1 | * | 10/2010 | Coulter .................. | G06Q 40/02 705/35 |

(Continued)

FOREIGN PATENT DOCUMENTS

| | | | | | |
|---|---|---|---|---|---|
| WO | WO-2005045625 A2 | * | 5/2005 | ............. | G06Q 20/20 |
| WO | WO-2007139867 A2 | * | 12/2007 | ............. | G06Q 40/02 |
| WO | WO2012/129154 | * | 3/2011 | ............. | G06Q 30/02 |

OTHER PUBLICATIONS

Scott-Briggs., "What is a Mobile-Wallet, Origin and History in Financial Technology", Fintech News—Nov. 29, 2016 (Year: 2016).*

*Primary Examiner* — Daniel S Felten

(57) ABSTRACT

A system and method for providing real-time replacement credit account information to a customer when existing credit account information is compromised. The method receives a report of the compromised credit account information for a customer's existing credit account. The compromised credit account information for the existing credit account is canceled. Replacement credit account information for the existing credit account is generated. At least a portion of the replacement credit account information is provided to the customer, such that the customer can continue to utilize the existing credit account without interruption.

15 Claims, 5 Drawing Sheets

100

(56)  References Cited

U.S. PATENT DOCUMENTS

| | | | | | |
|---|---|---|---|---|---|
| 7,844,520 B1* | 11/2010 | Franklin | G06Q 40/02 | | |
| | | | 705/42 | | |
| 7,853,782 B1* | 12/2010 | Geddes | H04L 63/029 | | |
| | | | 713/151 | | |
| 8,181,851 B2* | 5/2012 | Bennett | G06Q 30/0251 | | |
| | | | 705/16 | | |
| 8,396,794 B1* | 3/2013 | Mo | G06Q 20/10 | | |
| | | | 705/40 | | |
| 8,489,067 B2* | 7/2013 | Rackley, III | G06Q 20/3223 | | |
| | | | 455/406 | | |
| 8,560,366 B2* | 10/2013 | Mikurak | G06Q 30/0202 | | |
| | | | 705/7.12 | | |
| 8,626,667 B2* | 1/2014 | Walker | G06Q 20/383 | | |
| | | | 705/40 | | |
| 8,706,617 B2* | 4/2014 | Bard | G06Q 20/4037 | | |
| | | | 705/40 | | |
| 8,732,023 B2* | 5/2014 | Mikurak | G06Q 30/0269 | | |
| | | | 705/22 | | |
| 9,172,679 B1* | 10/2015 | Geddes | H04L 63/0884 | | |
| 9,727,871 B2* | 8/2017 | Allin | G06Q 30/00 | | |
| 9,922,345 B2* | 3/2018 | Mikurak | G06Q 30/0261 | | |
| 10,262,366 B2* | 4/2019 | Lutnick | G06Q 40/00 | | |
| 10,269,011 B2* | 4/2019 | Desai | G06Q 20/105 | | |
| 11,847,636 B2* | 12/2023 | Schmidt | G06Q 20/3672 | | |
| 2003/0167226 A1* | 9/2003 | Britton | G06Q 20/00 | | |
| | | | 705/38 | | |

| | | | |
|---|---|---|---|
| 2004/0111359 A1* | 6/2004 | Hudock | G06Q 40/02 |
| | | | 705/38 |
| 2005/0108130 A1* | 5/2005 | Monk | G06Q 20/26 |
| | | | 235/380 |
| 2005/0154664 A1* | 7/2005 | Guy | G06Q 40/00 |
| | | | 705/35 |
| 2005/0283662 A1* | 12/2005 | Li | G06F 11/1469 |
| | | | 714/13 |
| 2006/0122931 A1* | 6/2006 | Walker | G06Q 20/24 |
| | | | 705/39 |
| 2007/0033135 A1* | 2/2007 | Wokaty, Jr. | G06Q 40/08 |
| | | | 235/379 |
| 2009/0132415 A1* | 5/2009 | Davis | G06Q 20/10 |
| | | | 705/43 |
| 2010/0318782 A1* | 12/2010 | Auradkar | H04L 9/0891 |
| | | | 713/150 |
| 2010/0318812 A1* | 12/2010 | Auradkar | H04L 9/3073 |
| | | | 713/193 |
| 2014/0070001 A1* | 3/2014 | Sanchez | G06Q 20/321 |
| | | | 235/380 |
| 2018/0040064 A1* | 2/2018 | Grigg | H04L 41/147 |
| 2019/0005498 A1* | 1/2019 | Roca | G06Q 20/385 |
| 2020/0372506 A1* | 11/2020 | Billman | G06Q 20/341 |
| 2021/0012312 A1* | 1/2021 | Bradstreet | G06Q 20/4016 |
| 2021/0049565 A1* | 2/2021 | Anderson | G06Q 40/02 |
| 2021/0117969 A1* | 4/2021 | Chilaka | G06Q 20/4016 |
| 2022/0027891 A1* | 1/2022 | Anderson | G06Q 20/40145 |
| 2023/0004951 A1* | 1/2023 | Anderson | G06Q 40/03 |
| 2024/0412176 A1* | 12/2024 | Kurani | G06Q 20/06 |

* cited by examiner

300

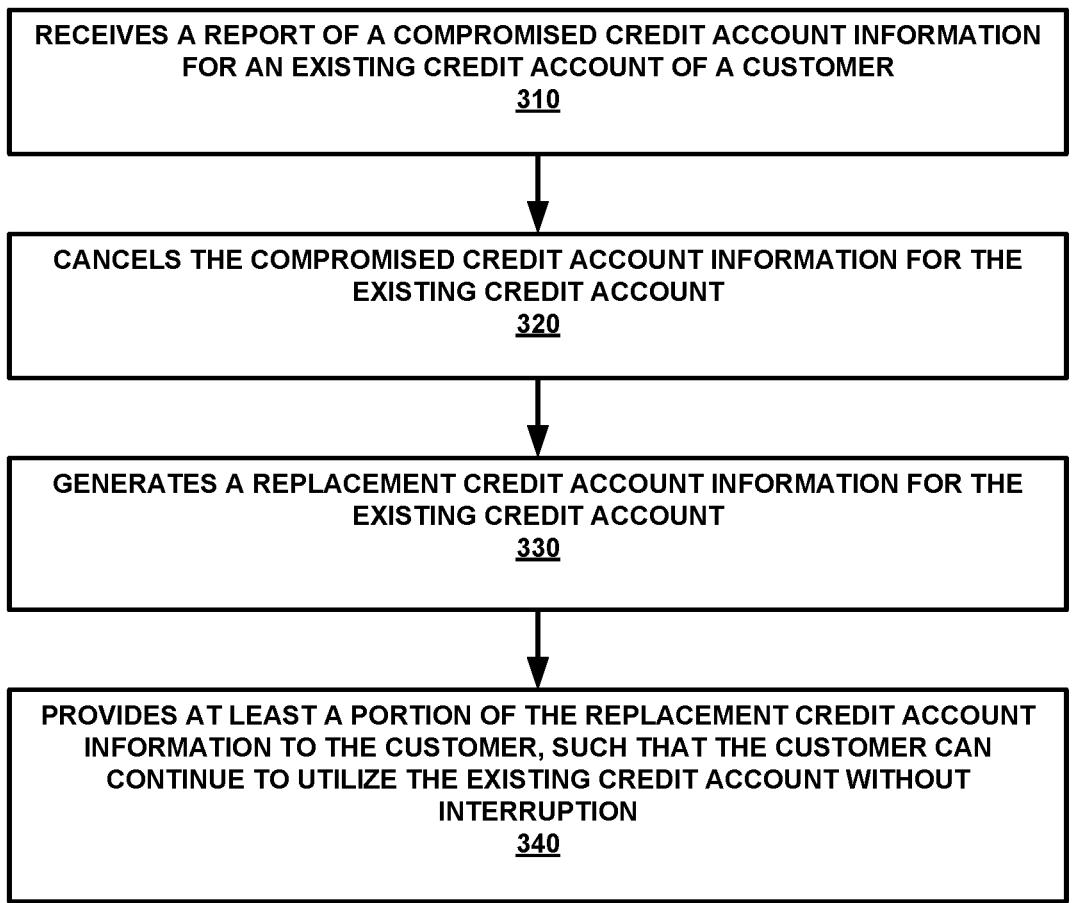

RECEIVES A REPORT OF A COMPROMISED CREDIT ACCOUNT INFORMATION FOR AN EXISTING CREDIT ACCOUNT OF A CUSTOMER
310

CANCELS THE COMPROMISED CREDIT ACCOUNT INFORMATION FOR THE EXISTING CREDIT ACCOUNT
320

GENERATES A REPLACEMENT CREDIT ACCOUNT INFORMATION FOR THE EXISTING CREDIT ACCOUNT
330

PROVIDES AT LEAST A PORTION OF THE REPLACEMENT CREDIT ACCOUNT INFORMATION TO THE CUSTOMER, SUCH THAT THE CUSTOMER CAN CONTINUE TO UTILIZE THE EXISTING CREDIT ACCOUNT WITHOUT INTERRUPTION
340

PERIPHERAL COMPUTER READABLE MEDIA 402

OPERATING SYSTEM 422

APPLICATIONS 424

MODULES 426

DATA 428

406C

406B

PROCESSOR 406A

COMPUTER USABLE MEMORY (ROM) 410

COMPUTER USABLE VOLATILE MEMORY (RAM) 408

DATA STORAGE UNIT 412

SIGNAL GEN/REC 430

BUS 404

DISPLAY DEVICE 418

ALPHA-NUMERIC INPUT 414

CURSOR CONTROL 416

I/O DEVICE 420

COMM INTERFACE 432

500

PROVIDING REAL-TIME REPLACEMENT CREDIT ACCOUNT INFORMATION TO A CUSTOMER WHEN AN EXISTING PHYSICAL CARD ASSOCIATED WITH THE CREDIT ACCOUNT IS COMPROMISED

CROSS-REFERENCE TO RELATED APPLICATIONS (PROVISIONAL)

This application claims priority to and benefit of co-pending U.S. Provisional Patent Application No. 62/872,143 filed on Jul. 9, 2019, entitled "PROVIDING REAL-TIME REPLACEMENT CREDIT ACCOUNT INFORMATION TO A CUSTOMER WHEN AN EXISTING PHYSICAL CARD ASSOCIATED WITH THE CREDIT ACCOUNT IS COMPROMISED" by Ann Bradstreet, and assigned to the assignee of the present application, the disclosure of which is hereby incorporated by reference in its entirety.

BACKGROUND

Presently, it is quite common for a customer to not carry a checkbook, a lot of cash, or even any cash at all. Instead, many customers make most or even all of their purchases with their credit card, debit card, or digitally stored card. Company specific or brand specific credit offering opportunities provide significant value to both a customer and a provider. By providing a credit offering opportunity, the provider is able to tailor rewards offers, provide loyalty discounts and maintain customer brand loyalty. Similarly, the customer receives the perks from the reward offers and the loyalty discounts. However, when a customer's card is compromised, there is often a relatively lengthy delay from the time the customer reports the compromised card until the new card is received by the customer and ready for use.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

FIG. 3 depicts a flow diagram for a method for providing real-time replacement credit account information to a customer when an existing physical card associated with the credit account is compromised, in accordance with an embodiment.

DESCRIPTION OF EMBODIMENTS

Figure 1:
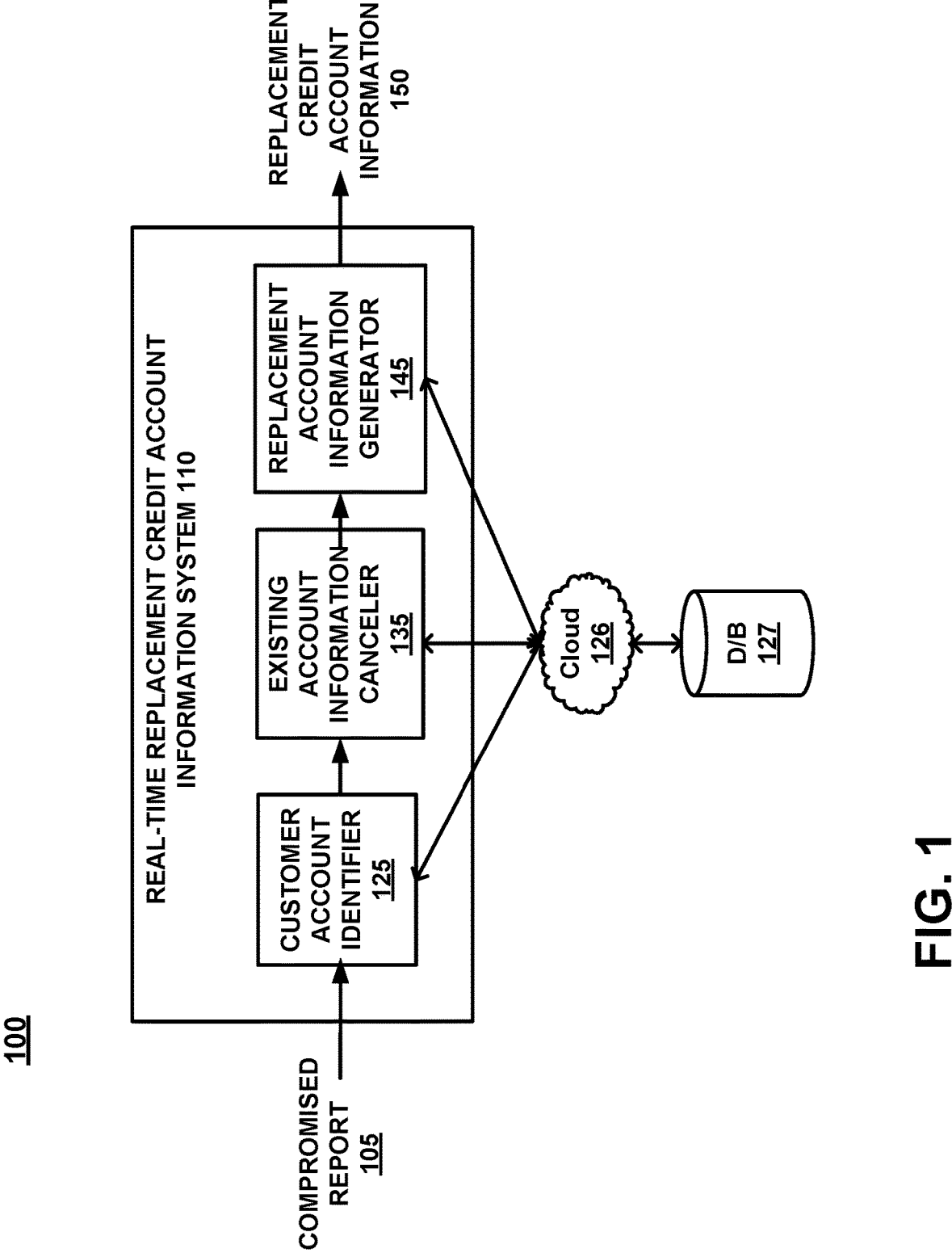
FIG. 1 is a block diagram of a real-time replacement credit account information system, in accordance with an embodiment.

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended Claims. Furthermore, in the Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "selecting", "outputting", "inputting", "providing", "receiving", "utilizing", "obtaining", "updating", "accessing", "changing", "correlating", "prescreening", "developing", "presenting" or the like, often refer to the actions and processes of an electronic computing device/system, such as a desktop computer, notebook computer, tablet, mobile phone, and electronic personal display, among others. The electronic computing device/system manipulates and transforms data represented as physical (electronic) quantities within the circuits, electronic registers, memories, logic, and/or components and the like of the electronic computing device/system into other data similarly represented as physical quantities within the electronic computing device/system or other electronic computing devices/systems.

Definitions

Account center—a customer facing portal providing credit account management functions.

Customer—a purchaser, consumer, or the like.

Credit provider (or Issuer)—a company that provides credit accounts for customers to use to make purchases.

Client—a retailer, merchant, retail store, or the like, that sells goods to customers and works with a credit provider.

Credit account data—account specific data that includes information such as a credit account number, an expiration date, a card security code (CSC), or a card verification value (CVV).

Overview

In the following discussion, a top-of-wallet card refers to a customer's go-to credit card. If the customer only has one credit card, then the customer's only credit card is the top-of-wallet card. However, if the customer has a number of credit cards, the top-of-wallet credit card is the one favored (or most used) card by a customer. Thus, the top-of-wallet card is the card that the customer prefers to use, uses most often, relies on, or the like.

The reason it is the customer's top-of-wallet card could be, but is not limited to, that it is the customer's only card, the customer has had it the longest (e.g., helping keep their credit score up), it has the lowest credit account balance, the desired credit limit, the preferred rewards, preferred offers, the lowest annual percentage rate (APR), it has an aesthetically pleasing design or color, it is made from a customer's preferred material, it has a certain status (e.g., brand name, mark, etc.), or the like.

However, when a customer is forced to cancel their top-of-wallet credit card because it is lost, stolen, being used without authorization, or the like, it takes an average of 7-10 business days (hereinafter down-days) before a replacement credit card is received in the mail. During those down-days, any purchases, payments, and the like must be done by the customer using a different payment method. The different payment method could be a different credit account: such as the customer's backup credit card account, a spouse's (or family member's, friend's, etc.) credit card account, a debit card, cash, money order, cashier's check, checkbook, person-to-person payment platform, etc. In some cases, the customer may even pass up on one or more purchases (in store and/or online) due to their top-of-wallet credit card being unavailable for use, the inconvenience, no other available method of payment, or the like.

In addition, even if the customer is using a different payment method during the down-days while the replacement top-of-wallet card is being printed and delivered to the customer, the top-of-wallet credit account provider is missing out on every transaction made by the customer during this period.

Further, the customer may, in turn, miss out on special promotions and card benefits during the down-days for their top-of-wallet card. Moreover, if the customer does have a second credit account, after using the second credit account during the down-days, there is an opportunity for the second credit account to become the customer's preferred new top-of-wallet card even after the replacement credit card arrives.

For example, the customer may discover features about the second credit account that were previously unknown. Similarly, the second credit account could note the uptick in use by the customer and provide offers, rewards, or other enticements in an attempt to have the customer move the second credit account into the top-of-wallet position even after the replacement card is received.

In yet another scenario, during the down-days, the customer may begin to look at other credit account offers and even apply for a different credit account. The customer may apply for a credit account out of need, convenience, based on an offer provided by a different credit account (e.g., the APR, cash back, reward points, free gift, etc.), or the like. Once the customer is using the different credit account, it is possible that the different credit account would become the new top-of-wallet card and the old top-of-wallet card would fall out of use. Thus, the replacement credit card would be relegated to the backup card, put in the desk drawer for emergencies, or the like.

Even more deleteriously, after enduring the down-days and moving into a different payment method (a different credit card, etc.) the customer may decide that they don't need (or want) the old top-of-wallet card and cancel the credit account completely.

Thus, embodiments of the present invention provide a capability to provide real-time replacement credit account information when an existing physical card associated with the credit account is compromised, which is completely different than what was previously done because of the Internet-centric card-not-present purchase capability.

As will be described in detail, the various embodiments of the present invention do not merely implement conventional credit card account replacement processes on a computing system. Instead, the various embodiments of the present invention, in part, provide a novel process for requesting, obtaining, and utilizing real-time replacement credit account information to provide some or all aspects of the purchasing process, which is necessarily rooted in Internet-centric computer technology to overcome a problem specifically arising in the realm of compromised credit accounts.

Moreover, the embodiments do not recite a mathematical algorithm; nor do they recite a fundamental economic or longstanding commercial practice. Instead, they address a business challenge that has been born in the Internet-centric environment. Thus, the embodiments do not merely recite the performance of some business practice known from the pre-Internet world along with the requirement to perform it on a computing device. Instead, the embodiments are necessarily rooted in network-centric environments in order to overcome new problems specifically arising in the modern fast paced want-it-now, purchase-it-now environment.

Operation

FIG. 1 With reference now to FIG. 1, a block diagram 100 of a real-time replacement credit account information system is shown in accordance with an embodiment. In one embodiment, FIG. 1 includes a compromised report 105, real-time replacement credit account information system 110, cloud 126, database 127, and replacement credit account information 150.

Figure 4:
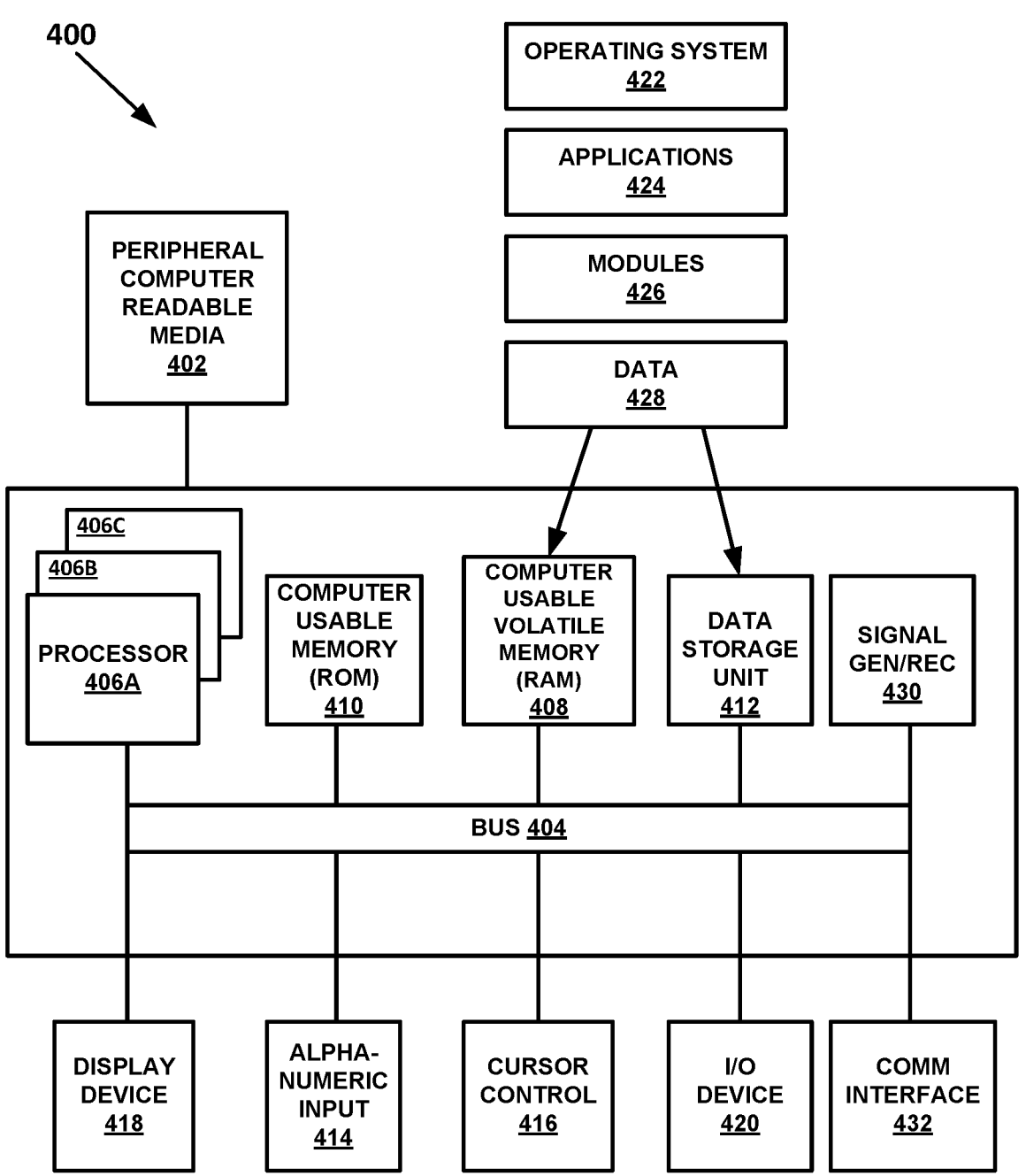
FIG. 4 is a block diagram of an example computer system with which or upon which various embodiments of the present invention may be implemented, in accordance with an embodiment.

In one embodiment, real-time replacement credit account information system 110 is a computing system such as computer system 400 described in detail in the FIG. 4 discussion herein. In one embodiment, real-time replacement credit account information system 110 includes a customer account identifier 125, an existing account information canceler 135, and a replacement account information generator 145.

In one embodiment, real-time replacement credit account information system 110 receives the compromised report 105. In one embodiment, compromised report 105 is received from a customer via a phone call, a customer's mobile device, an app on the customer's mobile device, or the like. In one embodiment, compromised report 105 is a report that the existing credit account has been compromised, the physical card has been lost, the physical card has been stolen, the account information has been stolen, or the like.

In one embodiment, compromised report 105 will include customer identifier 125 and/or mobile device 510 identification information. In general, compromised report 105 initiates a cancelation of the existing credit account card number.

In general, a mobile device ID can include one or more identification characteristics such as: a telephone number, a serial number, an international mobile equipment identity (IMEI), an integrated circuit card identifier (ICCID) (e.g., the SIM card number), a mobile equipment identifier (MEID), a secure element chipset identifier (SEID), a media access control (MAC) address, an Internet protocol (IP) address, a universal unique identifier (UUID), a model number, a product number, a serial number, or the like. In one embodiment, the mobile device ID is used to ensure that the compromised report 105 is being provided by the legitimate credit account holder.

In one embodiment, the mobile device ID can be based upon an evaluation of which of the possible mobile device ID's would provide the best capability for fraud prevention. For example, a user's phone number could be easily obtained (e.g., via social media, public records, white pages, Internet search, etc.) so it would be a lower mobile device ID option on a fraud scale. In contrast, the mobile device's serial number, IMEI, ICCID, MEID, SEID, or the like is much less likely to be obtained fraudulently (via social media, public records, guessed, etc.) so it may be that one of the IMEI, ICCID, MEID, SEID, or the like would be the mobile device ID requested due to the higher fraud prevention value.

The user ID can be information such as: name, zip code, social security number or a portion thereof, driver's license number or a portion thereof, or the like that is used to identify a customer to ensure that the compromised report 105 is being provided by the legitimate credit account holder.

In one embodiment, the user ID that is provided (or requested) is based upon an evaluation of which of the possible user ID's would provide the best capability for fraud prevention. For example, a user's birthday could be easily obtained (e.g., via social media, public records, etc.) so it would be a lower user ID option on a fraud scale. Similarly, a user's address could be easily obtained (e.g., via social media, public records, etc.) so it would also be a lower user ID option on a fraud scale. Further, a user's email could be easily obtained (e.g., via social media, public records, etc.) or easily guessed, so it would also be a lower user ID option on a fraud scale. In contrast, a social security number (or the last four, six, seven, five, middle three, five, first 6, 7; middle three+last two; or any other amount or combination of the nine social security numbers) is much less likely to be obtained fraudulently (e.g., via social media, public records, guessed, etc.) so it may be that a pre-selected portion of the SSN (or a changing selected portion of the SSN) would be the user ID with the highest fraud prevention value.

In one embodiment, the compromised report 105 is received by the real-time replacement credit account information system 110 and provided to the customer account identifier 125. In one embodiment, customer account identifier 125 utilizes the device ID and/or the customer ID information included in the compromised report 105 to identify the customer.

For example, customer account identifier 125 will accesses database 127 which stores a plurality of customer credit accounts. In one embodiment, customer account identifier 125 accesses database 127 via cloud 126. An example of cloud 126 is a network such as the Internet, local area network (LAN), wide area network (WAN), or the like.

Database 127 may include store specific data, brand specific data, retailer specific data, a shared database, a conglomerate database, a portion of a larger storage database, and the like. Moreover, database 127 could be a local database, a virtual database, a cloud database, a plurality of databases, or a combination thereof.

Customer account identifier 125 uses the user ID and/or the device ID to perform a search of database 127 for the compromised customer credit account. Once the compromised customer credit account is identified, it is provided to existing account information canceler 135 which will cancel the compromised credit card number (or other credit account purchasing identifier).

After canceling the compromised credit card information, replacement account information generator 145 will access the compromised customer credit account and generate a new card number, expiration date, and security code for the customer credit account in real-time (or near real-time). In one embodiment, the new card number, expiration date, and security code are not temporary but are instead the same credit account information that will be printed on the replacement physical credit card.

Replacement credit account information 150 is then provided from the real-time replacement credit account information system 110 (e.g., a credit provider computer system, third-party computing system, or the like) to the customer. Once the customer receives the replacement credit account information 150, the customer will be able to update any automated payments that were established with the compromised account, and use the replacement credit account information 150 to make purchases.

In one embodiment, one or more fraud deterring methods are used by the credit account provider while awaiting confirmation of the receipt of the actual physical card by the customer. For example, while the card is in route to the customer and before it is confirmed as being received by the customer, the customer would be sent a text confirming message with each purchase. In another embodiment, the text confirming message would only be sent for purchases over a certain amount. For example, if the customer spends less than 10 dollars (or any predefined fraud-detecting amount) the customer would not receive a text confirming message. In yet another embodiment, the text confirming message would only be sent for purchases that are not part of the customer's specific purchase routine. For example, if the customer makes a 5-12 dollar purchase at the same coffee shop every day (or any predefined routine amount) the customer would not receive a text confirming message. Although a text confirming message is used in the examples above, it should be appreciated that the confirming message could be a phone call, an email, or the like. Moreover, the avenue for delivering the confirming message could be selected by the customer and could be modifiable by the customer or the credit account provider.

Figure 2:
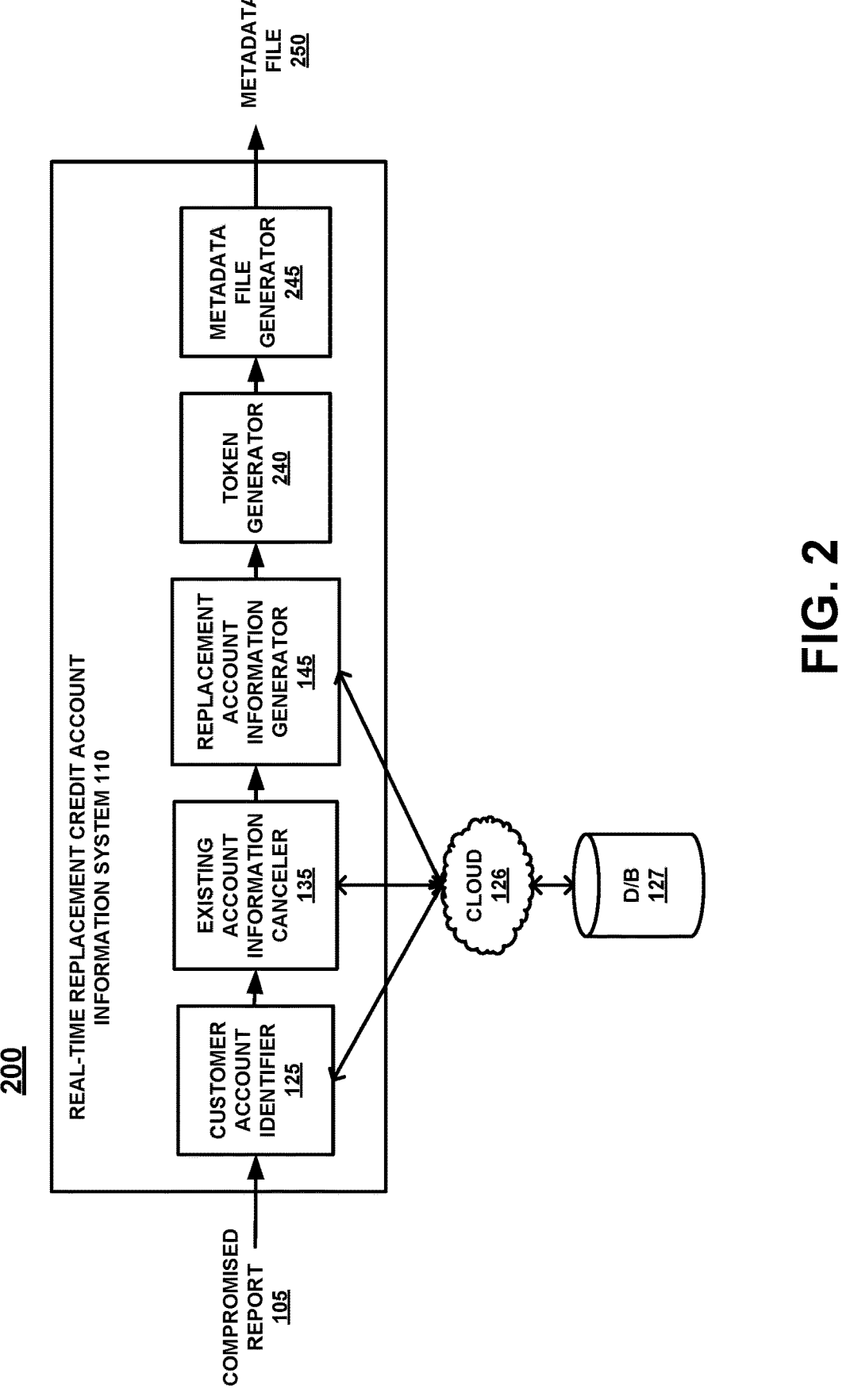
FIG. 2 is a block diagram of a real-time replacement credit account information system that provides electronic replacement credit account information to a customer's mobile wallet, in accordance with an embodiment.

With reference now to FIG. 2, a block diagram 200 of a real-time replacement credit account information system 110 that provides electronic replacement credit account information to a customer's mobile wallet is shown in accordance with an embodiment. In one embodiment, FIG. 2 includes a number of the same aspects as described in FIG. 1 herein. As such, it is only the portions of FIG. 2 that are not found in FIG. 1 which will be described in additional detail. In one embodiment, block diagram 200 includes a compromised report 105, real-time replacement credit account information system 110, cloud 126, database 127, and metadata file 250 which will include the replacement credit account information 150.

In one embodiment, real-time replacement credit account information system 110 is a computing system such as computer system 400 described in detail in the FIG. 4 discussion herein. In one embodiment, real-time replacement credit account information system 110 includes a customer account identifier 125, an existing account information canceler 135, a replacement account information generator 145, a token generator 240, and a metadata file generator 245.

In one embodiment, real-time replacement credit account information system 110 receives the compromised report 105 and provides the report to the customer account identifier 125 as described herein. As previously discussed, customer account identifier 125 accesses database 127 via cloud 126 and identifies the compromised customer credit account. The identified account is provided to existing account information canceler 135 which cancels the compromised credit card number (or another identifier). Replacement account information generator 145 accesses the compromised customer credit account and generates a new card number, expiration date, and security code for the customer credit account. In one embodiment, the new card number, expiration date, and security code are not temporary but are instead the credit account information that will be printed on the replacement physical credit card.

In one embodiment, token generator 240 accesses the customer credit account including the replacement credit account information and generates a token identifying the customer credit account. In one embodiment the token is an identification number, hash, or other type of anti-tamper encrypted protection that is generated as an identifier for the customer credit account. Although in one embodiment, a token is generated, it should be appreciated that there may be an identification scheme other than a token that is used. In one embodiment, the use of a token (or other identification tool) is provided for purposes of encryption, security, or the like.

Metadata file generator 245 generates a metadata file 250 formatted for mobile wallet 529, the metadata file 250 includes a digital identifier for the customer credit account and the token as tender vehicle 530. In one embodiment, the tender vehicle 530 could be an image, a scannable code, a near field communication (NFC) protocol, a sound, or the like. In one embodiment, the tender vehicle 530 includes the token embedded within the image data. In another embodiment, the token could be separate from the image that is presented when tender vehicle 530 is accessed and would be provided at the time of the transaction. For example, the token could be provided via a near field communication (NFC) between the mobile device 510 and the POS when tender vehicle 530 is presented at the POS. In another embodiment, the entire metadata file 250 could be provided via NFC at the time of the transaction and no imagery would be obtained by the POS even if it was presented on the display 112. In one embodiment, metadata file 250 includes an instruction that causes the tender vehicle 530 to be presented in a first location of mobile wallet 529 on the customer's mobile device 510.

The metadata file 250 is then provided from the real-time replacement credit account information system 110 to the customer's mobile device 510. The metadata file 250 is added to mobile wallet 529 on the customer's mobile device (e.g., mobile device 510 of FIG. 5), wherein access to the metadata file 250 at the mobile wallet causes the tender vehicle 530 to be presented by the customer's mobile device 510. Moreover, the presentation of tender vehicle 530 by the customer's mobile device 510 is utilized to provide payment at the time of a customer's purchase as described herein. As stated herein, the presentation could be visual (e.g., a barcode on the display screen), electronic (e.g., an NFC, Bluetooth, or similar electronic communications protocol), sound, or a combination thereof.

With reference now to FIG. 3, a flow diagram 300 for a method for providing real-time replacement credit account information to a customer when an existing physical card associated with the credit account is compromised is shown in accordance with an embodiment. In general, the disclosed features overcome the customer's complete loss of the ability to use the credit account during the down-days by providing the customer with replacement credit account information at the time the customer reports the loss (or otherwise cancels the credit card number). In one embodiment, the replacement credit account information includes a new card number, expiration date, and security code so that the customer can continue to use the credit account. For example, the customer can continue to make "card not present" transactions while they wait for the physical replacement card. In general, "card not present" transactions refers to transactions that occur over the Internet, by mail, fax, over the phone, and the like. The term "security code" can be a 3,4, or any number of digits code sometimes referred to as a card security code (CSC), a card verification value (CVV), a card verification code (CVC), a card validation code (CVC2), a card verification value 2 (CVV2), or the like.

With reference now to 310 of FIG. 3 and to FIG. 1, one embodiment receives a report of the compromised credit account information for a customer's existing credit account. As described herein, in one embodiment the customer user ID or the customer's device ID is used to confirm an identity of the provider of the report. In so doing, the ability to fraudulently file a report regarding compromised credit account information is reduced. In one embodiment, the user ID or device ID identity confirmation is performed before the replacement credit account information is disseminated. In so doing, the ability to fraudulently obtain the replacement credit account information is reduced.

Referring now to 320 of FIG. 3 and to FIG. 1, one embodiment cancels the compromised credit account information for the existing credit account. By canceling the compromised credit account information, no fraudulent charges (or no additional fraudulent charges) can be posted to the customer's existing credit account. Additionally, by reporting the loss, the customer's liability for any fraudulent charges is reduced, limited, or even removed altogether.

With reference now to 330 of FIG. 3 and to FIG. 1, one embodiment generates replacement credit account information for the existing credit account. In one embodiment, the replacement credit card account information is not intermediary account information, temporary account information, or the like. Instead, the replacement credit account information will be the same credit card information that will be printed on the replacement credit card that is going to be delivered to the customer. In so doing, there is no need for the customer to wait the down-days before updating any autopay scenarios, stored Internet shopping credit card account information, and the like. For example, the customer could log into their favorite Internet shopping site and update the payment information to reflect the replacement credit card number, expiration date, and security code knowing that they will not have to replace the information again when the replacement credit card is received. In one embodiment, the real-time replacement credit account information system 110 would automatically update some or all of the customer's autopay numbers so the customer does not have to do it. In one embodiment, the real-time replacement credit account information system 110 would make the update automatically. In another embodiment, the real-time replacement credit account information system 110 would make the update after obtaining the customer's permission and only for autopay numbers that were selected by the customer.

With reference now to 340 of FIG. 3 and to FIG. 1, one embodiment provides at least a portion of the replacement credit account information to the customer, such that the customer can continue to utilize the existing credit account without a delay. For example, the portion of the replacement credit account information will include a new card number, expiration date, and security code. In another embodiment, the portion of the replacement credit account information will include only information needed by the credit account provider for verifying and/or authorizing purchases with the virtual credit account in the customer's mobile wallet. In yet another embodiment, other aspects that are normally provided on a physical credit card (e.g., information about what to do if the card is lost, T's and C's, one or more contact phone numbers, holograms, chips, magnetic strips, and the like) may or may not be provided in the portion of the replacement credit account information provided to the customer.

In one embodiment, the replacement credit card account information could be provided electronically to the customer's mobile device, email, or the like. In one embodiment, the electronic card will mimic what the replacement card will look like and contain the replacement account information. In one embodiment, not only could this electronic replacement card be used until the real replacement card arrives, but the electronic replacement card could be sent via the Brand/card issuer to the customer and loaded to a wallet on the customer's mobile device for immediate use.

Thus, the benefits to the customer include the ability to continue purchasing, uninterrupted online or anywhere that takes Mobile wallet. Further, the replacement being provided in real-time to the mobile wallet provides additional security measures and fraud control due to methods such as encryption and tokenization used during the mobile wallet transaction. Moreover, mobile devices allow for a pin and/or biometric security that is stored on the customer's mobile device and not in a remote database.

As such, the present technology removes almost all (or, in some cases, all) lag time between the canceling of a compromised credit card and receipt of the purchase-ready replacement credit card. The technology further ensures that a customer will not miss out on current campaigns and savings during the down-days.

In one embodiment, benefits to the credit account provider include the ability to allow the customer to continue using the credit account as the top-of-wallet credit account following a cancellation as the customer can continue using the replacement card information to make purchases. Benefits could also include allowing the customer to obtain the electronic replacement card and then choose not to receive the physical replacement card at all. Thus, the credit account provider would not need to print and mail the physical replacement card which would save money, be environmentally sound, and the like.

In one embodiment, the replacement credit card account information could be provided by the account center or the brand (if it is a brand or co-brand credit account). In one embodiment, a customer could be required to register through an account center before obtaining the replacement credit card information. Such an action would provide another level of security to the electronic credit account process to ensure the replacement credit card information is not being supplied to the wrong party, either accidentally or due to malfeasance.

Loss/Savings Example

Assuming the average credit card customer spends approximately $640 dollars per month or approximately $21 a day on a credit card.

Further assuming, the average customer wait time for the replacement card is 5 days. Thus, the down-days for the top-of-wallet credit card account provider is 5 days of spending.

Assuming the customer returns the replacement credit card to the top-of-wallet, the credit account provider loses an average of $105 spent dollars per customer during the down-days.

If the credit card account provider averages 1,250,000 replacement (e.g., lost, stolen, etc.) and new account customers per month. The total money lost by the credit card account provider, due to the down-days, is approximately 131 million dollars per month. This equates to approximately $1.5 billion dollars per year.

Moreover, these numbers do not reflect any additional loses that occur when a different credit card account becomes the new top-of-wallet card due to the down-days delay between the reporting the original top-of-wallet credit card loss and the receipt of the replacement credit card.

Example Computer System Environment

With reference now to FIG. 4, portions of the technology for providing a communication composed of computer-readable and computer-executable instructions that reside, for example, in non-transitory computer-readable medium (or storage media, etc.) of a computer system. That is, FIG. 4 illustrates one example of a type of computer that can be used to implement embodiments of the present technology. FIG. 4 represents a system or components that may be used in conjunction with aspects of the present technology. In one embodiment, some or all of the components described herein may be combined with some or all of the components of FIG. 4 to practice the present technology.

FIG. 4 illustrates an example computer system 400 used in accordance with embodiments of the present technology. It is appreciated that computer system 400 of FIG. 4 is an example only and that the present technology can operate on or within a number of different computer systems including general purpose networked computer systems, embedded computer systems, routers, switches, server devices, user devices, various intermediate devices/artifacts, stand-alone computer systems, mobile phones, personal data assistants, televisions and the like. As shown in FIG. 4, computer system 400 of FIG. 4 is well adapted to having peripheral computer readable media 402 such as, for example, a disk, a compact disc, a flash drive, and the like coupled thereto.

Computer system 400 of FIG. 4 includes an address/data/control bus 404 for communicating information, and a processor 406A coupled to bus 404 for processing information and instructions. As depicted in FIG. 4, computer system 400 is also well suited to a multi-processor environment in which a plurality of processors 406A, 406B, and 406C are present. Conversely, computer system 400 is also well suited to having a single processor such as, for example, processor 406A. Processors 406A, 406B, and 406C may be any of various types of microprocessors. Computer system 400 also includes data storage features such as a computer usable volatile memory 408, e.g., random access memory (RAM), coupled to bus 404 for storing information and instructions for processors 406A, 406B, and 406C.

Computer system 400 also includes computer usable non-volatile memory 410, e.g., read only memory (ROM), coupled to bus 404 for storing static information and instructions for processors 406A, 406B, and 406C. Also present in computer system 400 is a data storage unit 412 (e.g., a magnetic disk drive, optical disk drive, solid state drive (SSD), and the like) coupled to bus 404 for storing information and instructions. Computer system 400 also can optionally include an alpha-numeric input device 414 including alphanumeric and function keys coupled to bus 404 for communicating information and command selections to processor 406A or processors 406A, 406B, and 406C. Computer system 400 also can optionally include a cursor control device 416 coupled to bus 404 for communicating user input information and command selections to processor 406A or processors 406A, 406B, and 406C. Cursor control device may be a touch sensor, gesture recognition device, and the like. Computer system 400 of the present embodiment can optionally include a display device 418 coupled to bus 404 for displaying information.

Referring still to FIG. 4, display device 418 of FIG. 4 may be a liquid crystal device, cathode ray tube, OLED, plasma display device or other display device suitable for creating graphic images and alpha-numeric characters recognizable to a user. Cursor control device 416 allows the computer user to dynamically signal the movement of a visible symbol (cursor) on a display screen of display device 418. Many implementations of cursor control device 416 are known in the art including a trackball, mouse, touch pad, joystick, non-contact input, gesture recognition, voice commands, bio recognition, and the like. In addition, special keys on alpha-numeric input device 414 capable of signaling movement of a given direction or manner of displacement. Alternatively, it will be appreciated that a cursor can be directed and/or activated via input from alpha-numeric input device 414 using special keys and key sequence commands.

Computer system 400 is also well suited to having a cursor directed by other means such as, for example, voice commands. Computer system 400 also includes an I/O device 420 for coupling computer system 400 with external entities. For example, in one embodiment, I/O device 420 is a modem for enabling wired or wireless communications between computer system 400 and an external network such as, but not limited to, the Internet or intranet. A more detailed discussion of the present technology is found below.

Referring still to FIG. 4, various other components are depicted for computer system 400. Specifically, when present, an operating system 422, applications 424, modules 426, and data 428 are shown as typically residing in one or some combination of computer usable volatile memory 408, e.g. random access memory (RAM), and data storage unit 412. However, it is appreciated that in some embodiments, operating system 422 may be stored in other locations such as on a network or on a flash drive; and that further, operating system 422 may be accessed from a remote location via, for example, a coupling to the interne. In one embodiment, the present technology, for example, is stored as an application 424 or module 426 in memory locations within RAM 408 and memory areas within data storage unit 412. The present technology may be applied to one or more elements of described computer system 400.

Computer system 400 also includes one or more signal generating and receiving device(s) 430 coupled with bus 404 for enabling computer system 400 to interface with other electronic devices and computer systems. Signal generating and receiving device(s) 430 of the present embodiment may include wired serial adaptors, modems, and network adaptors, wireless modems, and wireless network adaptors, global positioning systems (GPS) 518 or other location information, and other such communication technology. The signal generating and receiving device(s) 430 may work in conjunction with one (or more) communication interface 432 for coupling information to and/or from computer system 400. Communication interface 432 may include a serial port, parallel port, Universal Serial Bus (USB), Ethernet port, Bluetooth, thunderbolt, near field communications port, WiFi, Cellular modem, or other input/output interface. Communication interface 432 may physically, electrically, optically, or wirelessly (e.g., via radio frequency) couple computer system 400 with another device, such as a mobile phone, radio, or computer system.

Computer system 400 is only one example of a suitable computing environment and is not intended to suggest any limitation as to the scope of use or functionality of the present technology. Neither should the computing environment be interpreted as having any dependency or requirement relating to any one or combination of components illustrated in the example computer system 400.

Mobile Device

Figure 5:
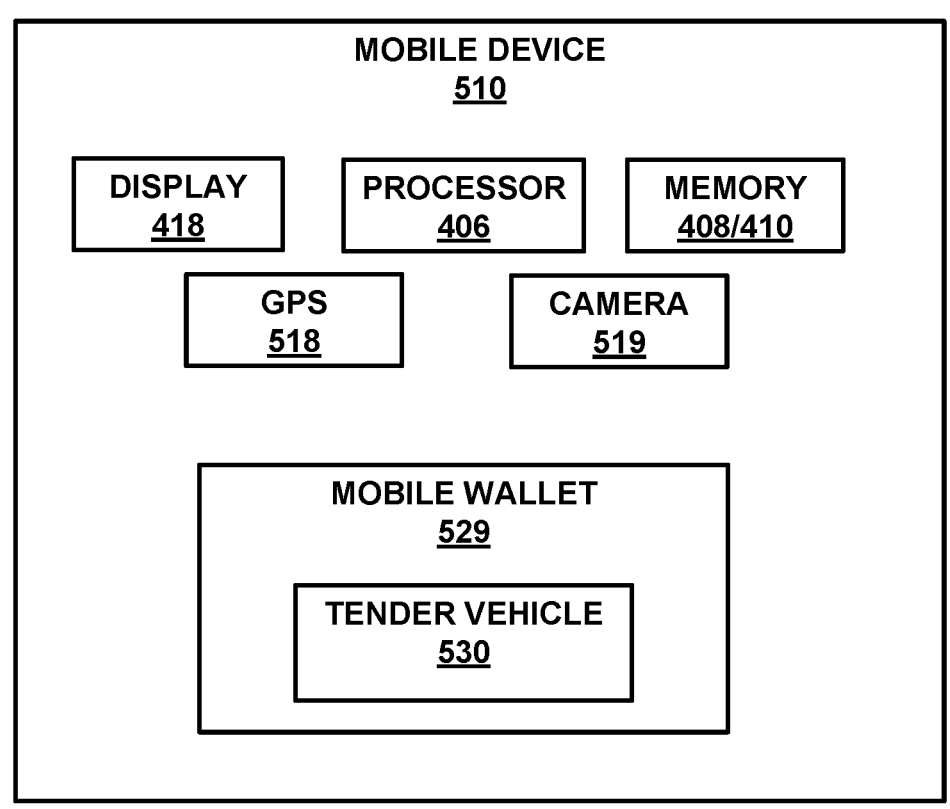
FIG. 5 is a block diagram of a mobile device with a mobile wallet with which or upon which various embodiments of the present invention may be implemented, in accordance with an embodiment.

Referring now to FIG. 5, a block diagram 500 of a mobile device 510 is shown. Although a number of components are shown as part of mobile device 510, it should be appreciated that other, different, more, or fewer components may be found on mobile device 510.

In general, mobile device 510 is an example of a customer's mobile device, a store's mobile device, an associate's mobile device, or the like. Mobile device 510 could be a mobile phone, a smart phone, a tablet, a smart watch, a piece of smart jewelry, smart glasses, or other user portable devices having wireless connectivity. For example, mobile device 510 would be capable of broadcasting and receiving via at least one network, such as, but not limited to, WiFi, Cellular, Bluetooth, NFC, and the like. In one embodiment, mobile device 510 includes a display 418, a processor 406, a memory 408/410, a GPS 518, a camera 519, and the like. In one embodiment, instead of providing GPS information, the location of mobile device 510 may be determined within a given radius, such as the broadcast range of an identified beacon, a WiFi hotspot, overlapped area covered by a plurality of mobile telephone signal providers, or the like.

Mobile device 510 also includes a mobile wallet 529 (passbook, or the like) which is an electronic application that operates on mobile device 510. Mobile wallet 529 includes tender vehicle 530. In one embodiment, tender vehicle 530 is an electronically stored credit account.

In general, tender vehicle 530 is carried in a secure digital form on a mobile device 510. Instead of using a physical card to make purchases, a mobile wallet allows a customer to use tender vehicle 530 as a method of payment via mobile device 510 in stores, in apps, or on the web.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments may be combined. Although some embodiments have been described in a language specific to structural features and/or methodological acts, it is to be understood that the subject matter defined in the Claims is not necessarily limited to the specific features or acts described above. Rather, the specific features and acts described above are disclosed by way of illustration and as example forms of implementing the concepts and their equivalents.

I claim:

1. A non-transitory computer-readable storage medium having instructions embodied therein that when executed cause a credit provider computer system of a credit provider to:

receive, directly from a customer's mobile device, a report of a compromised credit account information for an existing credit account of a customer of said credit provider;

determine said existing credit account identified by said report of said compromised credit account information was issued by said credit provider;

access a database comprising a plurality of existing customer credit accounts;

identify said existing credit account of said customer from said database of said plurality of existing customer credit accounts;

cancel said compromised credit account information from said existing credit account of said customer;

generate a replacement credit account information for said existing credit account of said customer, said replacement credit account information comprising:

a new card number;

a new expiration date; and a new security code, wherein said replacement credit account information is not temporary;

add said replacement credit account information to said existing credit account of said customer at said database;

initiate a communication directly with said customer's mobile device; and provide, via an electronic communication directly with said customer's mobile device, said replacement credit account information in a metadata file configured to automatically replace said compromised credit account information stored at said customer's mobile device such that said replacement credit account information provides immediate mobile purchase capability after it is automatically placed.

2. The non-transitory computer-readable storage medium of claim 1, further comprising:

utilize, from said report of said compromised credit account information, a customer user ID to confirm an identity of a provider of said report.

3. The non-transitory computer-readable storage medium of claim 1, further comprising:

utilize, from said report of said compromised credit account information, a device ID to confirm an identity of a provider of said report.

4. The non-transitory computer-readable storage medium of claim 1, further comprising:

confirm, from said existing credit account of said customer at said database, a customer user ID prior to said replacement credit account information being provided to said mobile wallet of said customer's mobile device.

5. The non-transitory computer-readable storage medium of claim 1, further comprising:

confirm, from said existing credit account of said customer at said database, a device ID prior to said replacement credit account information being provided to said mobile wallet of said customer's mobile device.

6. A credit provider computer system of a credit provider comprising:

a memory, said memory comprising a plurality of existing customer credit accounts; and a processor, said processor configured to:

receive, directly from a customer's mobile device, a report of a compromised credit account information for an existing credit account of a customer of said credit provider;

determine said existing credit account identified by said report of said compromised credit account information was issued by said credit provider;

access said memory;

identify said existing credit account of said customer from said memory comprising said plurality of existing customer credit accounts;

cancel-said compromised credit account information from said existing credit account of said customer;

generate a replacement credit account information for said existing credit account of said customer, said replacement credit account information comprising:

a new card number;

a new expiration date; and a new security code, wherein said replacement credit account information is not temporary;

add said replacement credit account information to said existing credit account of said customer at said memory; and provide, via an electronic communication directly with said customer's mobile device, said replacement credit account information in a metadata file configured to automatically replace said compromised credit account information in said mobile wallet such that said replacement credit account information provides immediate mobile purchase capability after it is automatically placed.

7. The credit provider computer system of claim 6 wherein a customer user ID, obtained from said report of said compromised credit account information, is used to confirm an identity of a provider of said report.

8. The credit provider computer system of claim 6 wherein a device ID, obtained from said report of said compromised credit account information, is used to confirm an identity of a provider of said report.

9. The credit provider computer system of claim 6 wherein a customer user ID, obtained from said report of said compromised credit account information, is validated by said processor prior to said replacement credit account information is provided to said mobile wallet of said customer's mobile device.

10. The credit provider computer system of claim 6 wherein a device ID, obtained from said report of said compromised credit account information, is validated by said processor prior to said replacement credit account information is provided to said mobile wallet of said customer's mobile device.

11. A computer-implemented method for providing real-time replacement credit account information when an existing credit account information is compromised, said computer-implemented method comprising:

receiving, at a credit provider computer system of a credit provider and directly from a customer's mobile device, a report of a compromised credit account information for an existing credit account of a customer of said credit provider;

determining, at said credit provider computer system, existing credit account identified by said report of said compromised credit account information was issued by said credit provider;

accessing, via said credit provider computer system, a database comprising a plurality of existing customer credit accounts;

identifying, via said credit provider computer system, said existing credit account of said customer from said database of said plurality of existing customer credit accounts;

canceling, from said database accessed via said credit provider computer system, said compromised credit account information from said existing credit account of said customer;

generating, at said credit provider computer system, a replacement credit account information for said existing credit account of said customer, said replacement credit account information comprising:

a new card number;

a new expiration date; and a new security code, wherein said replacement credit account information is not temporary;

adding, to said database via said credit provider computer system, said replacement credit account information to said existing credit account of said customer; and providing, via an electronic communication directly between said credit provider computer system and said customer's mobile device, said replacement credit account information in a metadata file configured to automatically replace said compromised credit account information in said mobile wallet such that said replacement credit account information provides immediate mobile purchase capability when it is automatically placed.

12. The computer-implemented method as recited in claim 11, further comprising:

utilizing, at said credit provider computer system and from said report of said compromised credit account information, a customer user ID to confirm an identity of a provider of said report.

13. The computer-implemented method of claim 11, further comprising:

utilizing, at said credit provider computer system and from said report of said compromised credit account information, a device ID to confirm an identity of a provider of said report.

14. The computer-implemented method as recited in claim 11, further comprising:

confirming, via said credit provider computer system and from said existing credit account of said customer at said database, a customer user ID prior to providing said replacement credit account information to said mobile wallet of said customer's mobile device.

15. The computer-implemented method as recited in claim 11, further comprising:

confirming, via said credit provider computer system and from said existing credit account of said customer at said database, a device ID prior to providing said replacement credit account information to said mobile wallet of said customer's mobile device.

\* \* \* \* \*